Figure 1:
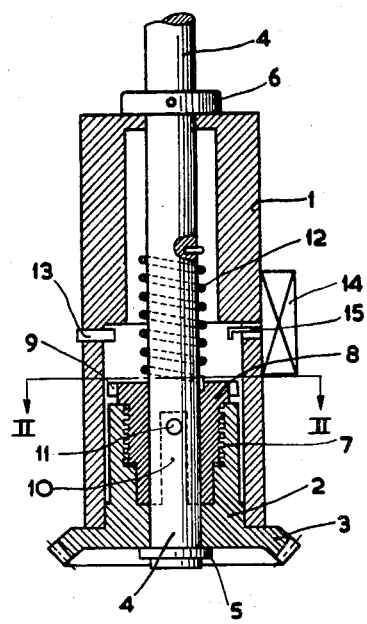

March 6, 1962   J. VERHOEFF   3,023,871
OVERLOAD COUPLING
Filed Oct. 31, 1956

INVENTOR
JACOB VERHOEFF

United States Patent Office 3,023,871
Patented Mar. 6, 1962

3,023,871
OVERLOAD COUPLING
Jacob Verhoeff, Hilversum, Netherlands, assignor, by mesne assignments, to North American Philips Company, Inc., New York, N.Y., a corporation of Delaware
Filed Oct. 31, 1956, Ser. No. 619,638
Claims priority, application Netherlands Nov. 4, 1955
7 Claims. (Cl. 192—56)

Overload couplings for connecting a rotary driving shaft to a driven shaft, which comprise an auxiliary member which, during normal operation, is connected to the two shafts, wherein the connection between the driving and the auxiliary member in the case of overload is interrupted and the driven shaft after interruption is subject to the action of a predetermined directional force. Such couplings are frequently used, for example, in shaft-positioning mechanisms operating with pawl levers and ratchet wheels, in which, when a ratchet wheel is blocked, the pawl lever after disconnection of the coupling is always urged with the same force against one side of the notch of the ratchet wheel in order to eliminate the play always in the same direction and to the same extent. However, said known couplings have the disadvantage of being comparatively expensive in the manufacture and comparatively voluminous. The coupling according to the invention, on the contrary, may be manufactured at low cost and is not particularly voluminous, so that the construction in which the coupling is used may be more compact than in the known construction.

According to the invention, an overload coupling of the above-mentioned kind is characterized in that the spring is a compression spring axially surrounding the driven shaft and that between the auxiliary member and the driven shaft there is provided a coupling which permits both an axial displacement and a limited rotation of the auxiliary member with respect to the driven shaft, while between the driving shaft and the auxiliary member there is provided a coupling which is disconnected against the pressure of the spring due to the axial displacement of the auxiliary member.

It is advantageous if the spring which not only provides a compression tension on the auxiliary member but also after interruption of the coupling is the source of the directional force, according to one embodiment of the invention, has both a compression pre-tension and a torsional pre-tension, the force exerted upon the auxiliary member by the compression pre-tension being higher than that exerted by the torsional pre-tension.

The coupling between the auxiliary member and the driving shaft may be effected in different ways. In one embodiment of the invention, the coupling between the auxiliary member and the driving shaft preferably comprises a screwed connection which is simple and cheap in the manufacture. Thus, when overload occurs, the auxiliary member is screwed out of the driving member. Due to the resultant torsional tension between the auxiliary member and the driven shaft it is necessary to prevent rotation of the auxiliary member when the coupling is disconnected. In one embodiment of the invention, this may be effected by shaping part of the auxiliary member in the form of a ratchet wheel and providing a lug which is connected to a fixed point and which co-operates with the ratchet wheel when the coupling is interrupted, while the screwed connection is self-braking in the axial direction.

It is usually desirable, when the coupling is disconnected, that the rotation of the driving shaft should be stopped. In a further embodiment of the invention, for this purpose an electric switch is provided which is operated by the auxiliary member when the coupling is disconnected.

An overload coupling according to the invention may be constructed in a simpler manner, if, in a further embodiment of the invention, it comprises a housing which at one side has a driving member which can rotate freely and in which a shaft is journalled which is likewise freely rotatable. The aforesaid shaft at the other end is journalled in the housing and has a radially projecting pin fitting with generous play into a groove of the threaded auxiliary member which may be screwed into and out of the driving member. The length of the groove is such that the pin still lies in the groove when the auxiliary member has been screwed fully out of the member, a compression and torsion spring being provided which, at one end, is secured to the shaft and, at the other, connected to the auxiliary member.

Figure 2:
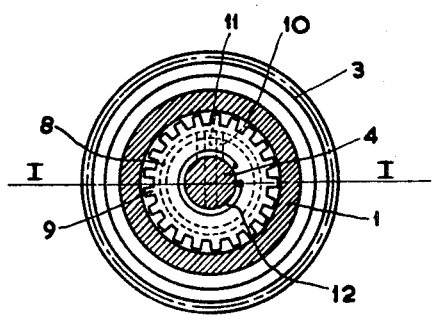

In order that the invention may be readily carried into effect, one embodiment will now be described, by way of example, with reference to the accompanying drawing, in which:

FIG. 1 is a sectional view of an overload coupling taken along the line I—I of FIG. 2, and FIG. 2 shows a cross-section taken along the line II—II of FIG. 1, as viewed in the direction of the arrows.

Reference numeral 1 indicates a housing which is fixedly arranged and in which a member 2 and a gear-wheel 3 connected thereto can rotate freely. The member 2 fulfills the function of a driving shaft in the coupling. The member 2 contains a shaft 4 which at the other end is journalled in the housing 1, this shaft comprising a collar 5 and an adjusting ring 6 respectively at its ends. The member 2 is provided with an internal screw-thread 7. An auxiliary member 8 has at its upper end, a collar 9 which is formed as a ratchet wheel and is likewise threaded. The screw-threads are self-braking in the axial direction with respect to one another. In the position shown, in which the member 2 and the shaft 4, which constitute the driving shaft and the driven shaft, are coupled together, the auxiliary member 8 is fully screwed into the member 2. The auxiliary member furthermore has a slot 10 containing a pin 11 which is secured to the shaft 4. The pin 11 has a comparatively large free stroke in the slot 10. A spring 12, which is both a compression spring and torsion spring, is secured to the shaft 4 and to the auxiliary member 8 respectively. The housing 1 also carries a lug 13 and a switch 14, the operating lever 15 of which is located in the interior of the housing 1.

In the normal operation of the present coupling the driving element 2 takes the auxiliary member 8 along with it. Member 8 remains screwed into driving element 2 because the spring maintains a constant force holding the member 8 in the driving element 2. The driven shaft 4 is driven by means of pin 11 engaging the sides of the slot 10 of the auxiliary member 8. Upon overload of the shaft 4, the auxiliary member 8 screws itself out of the driving element 2 so there is no longer any driving connection between element 2 and member 8. The lug 13 and ratchet wheel 9 engage and thereby keep the member 8 in its withdrawn position. It should be noted that when there is no overload the spring 12 has a higher compressional force than the torsional force, however, as soon as overload occurs the torsional force becomes higher than the compressional force and the pin 11 displaces itself in slot 10 to therey apply a directional force on driven shaft 4 as soon as the whole coupling is uncoupled. In connection with the self-braking device it should be noted that if the screw thread 7 is not self-braking it would be possible that the member 8 would screw itself back into the driving element 2 by the force of spring 12. By making the screw thread self-braking and providing lug 13 and ratchet wheel 9 on the device, the aforesaid is not possible. It should be noted that when the axial compression force of the spring 12 is projected against the screw-type auxiliary member 8 in a downwardly direction auxiliary member 8 will not move but will remain fixed in the position with the lug 13 between two adjacent teeth of the ratchet wheel 9. However, when the rotation of member 3 is reversed, auxiliary member 8 is pressed by the spring 12 against the surface of the member 3 and screwed back into the member 2.

It should also be noted that when the overload disappears the driving motor is started in reverse direction, then the torsional force of spring 12 is overcome by its directional force and the auxiliary member 8 is screwed back into the member 2 and the initial, normal position is reached. Then, the switch 14 is changed over again and the electric motor receives current through this switch and operates in the normal direction.

The connection between the spring 12 and the shaft 4 may be made adjustable by known means which permit adjustment of both the torsional tension and the compression tension.

When a self-braking connection is provided between the member 2 and the driving means, the lug 13 and the ratchet wheel 9 may be dispensed with and the screw-thread between the auxiliary member 8 and the member 2 may not be self-braking in the axial direction.

The overload coupling as decribed is simple and compact. A coupling realised in accordance with the present invention, which was suitable for adjusting a shaft-positioning mechanism, had a diameter of about 12 mms. It is naturally possible to omit the gear-wheel 3 and to couple the member 2 directly with the driving shaft, so that the driving shaft and the driven shaft are in line with one another. The coupling described is not particularly suitable for high power transmission but it affords many advantages for use in, for example shaft-positioning mechanisms.

It should be noted that the torsional force of the spring 12 is increased because of the relative rotation of the intermediate member 8 with respect to the pin 10 and the slot 11.

What is claimed is:

1. An overload coupling comprising a rotary driving element, a driven shaft, an auxiliary member located between and connecting said driving element and said driven shaft during normal operation of said coupling and removing the connection between said driving element and driven shaft upon the occurrence of an overload, compression spring means coupling said auxiliary member to said driven shaft and axially surrounding the latter whereby said driven shaft after disconnection of said driving element and driven shaft is subject to the action of a predetermined directional force created by said spring means, means for preventing rotation of said auxiliary member when said overload coupling is disconnected, means linking said auxiliary member and said driven shaft whereby an axial displacement and limited rotational movement of said auxiliary member relative to said driven shaft is permitted, and said auxiliary member upon overload being disconnected from said driving element against the pressure of said spring due to the axial displacement of said auxiliary member.

2. An overload coupling as claimed in claim 1 wherein said compression spring has both a compressional force and a torsional force in which the force exerted on the auxiliary member by the compressional force is greater than the force exerted on the auxiliary member by the torsional force.

3. An overload coupling as claimed in claim 1 wherein said driving element and said auxiliary member have mating screw threads forming a screw-connection.

4. An overload coupling comprising a rotary driving element, a driven shaft, an auxiliary member located between and connecting said driving element and said driving shaft during normal operation of said coupling and removing the connection between said driving element and driven shaft upon the occurrence of an overload, compression spring means coupling said auxiliary member to said driven shaft and axially surrounding the latter whereby said driven shaft after disconnection of said driving element and driven shaft is subject to the action of a predetermined directional force created by the spring means, means for preventing rotation of said auxiliary member when said overload coupling is disconnected, means linking said auxiliary member and said driven shaft whereby an axial displacement and limited rotational movement of said auxiliary member relative to said driven shaft is permitted, and said auxiliary member upon overload being disconnected from said driven element against the pressure of said spring due to the axial displacement of said auxiliary member, a ratchet wheel on said auxiliary member, a fixed ratchet co-acting with said ratchet wheel when said coupling is disconnected to prevent movement of said auxiliary member.

5. An overload coupling as claimed in claim 1 further comprising a self-braking transmission mechanism connected to said driving element.

6. An overload coupling as claimed in claim 1 further comprising an electric switch operated by said auxiliary member when said coupling is disconnected.

7. An overload coupling comprising a housing; a rotary driving element, a driven shaft and an auxiliary member mounted in said housing, said driven shaft being provided with a radially projecting pin, said auxiliary member and said driving element being screw-connected, said auxiliary member being provided with an elongated slot in which said projecting pin extends with a limited amount of rotational play, the length of said slot being such that said pin remains in said slot when, upon overload, said auxiliary member is completely screwed out of said driving element and said driving element is disconnected from said driven shaft, said driven shaft after disconnection of said driving element and driven shaft being subject to the action of a predetermined directional force, a compression spring secured at one end to said driven shaft and at the other end to said auxiliary member coupling said auxiliary member to said driven shaft, means for preventing rotation of said auxiliary member when said overload coupling is disconnected, and said auxiliary member upon overload being disconnected from said driving element against the pressure of said spring due to the axial dis placement of said auxiliary member.

References Cited in the file of this patent

UNITED STATES PATENTS

| | | |
|---|---|---|
| 1,681,289 | Galloway | Aug. 21, 1928 |
| 2,102,002 | Hill | Dec. 14, 1937 |
| 2,151,724 | Wengel et al. | Mar. 28, 1939 |
| 2,317,490 | Simpson | Apr. 27, 1943 |
| 2,504,018 | Gibson et al. | Apr. 11, 1950 |